(12) United States Patent
Sweatte (10) Patent No.: US 8,878,645 B2
(45) Date of Patent: *Nov. 4, 2014

(54) METHOD AND SYSTEM FOR AIRPORT SECURITY

(71) Applicant: Clifford Sweatte, Bluemont, VA (US)

(72) Inventor: Clifford Sweatte, Bluemont, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,853

(22) Filed: Jul. 30, 2013

(65) Prior Publication Data

US 2014/0062651 A1 Mar. 6, 2014

Related U.S. Application Data

(63) Continuation of application No. 12/407,032, filed on Mar. 19, 2009, now abandoned, which is a continuation of application No. 11/433,830, filed on May 12, 2006, now Pat. No. 7,515,055, which is a continuation-in-part of application No. 10/751,552, filed on Jan. 5, 2004, now Pat. No. 7,109,869, which is a continuation-in-part of application No. 10/023,421, filed on Dec. 17, 2001, now Pat. No. 6,674,367, which is a continuation-in-part of application No. 09/669,417, filed on Sep. 25, 2000, now Pat. No. 6,335,688.

(60) Provisional application No. 60/156,447, filed on Sep. 28, 1999.

(51) Int. Cl.
| | |
|---|---|
| *G08B 1/08* | (2006.01) |
| *G07C 9/00* | (2006.01) |
| *H04L 29/06* | (2006.01) |
| *H04W 12/06* | (2009.01) |
| *H04W 12/00* | (2009.01) |
| *H04W 64/00* | (2009.01) |

(52) U.S. Cl.
CPC ........ *G07C 9/00087* (2013.01); *H04L 63/0861* (2013.01); *G07C 9/00158* (2013.01); *G07C 9/00111* (2013.01); *H04L 63/083* (2013.01); *H04W 12/00* (2013.01); *H04W 12/06* (2013.01); *H04W 64/00* (2013.01)
USPC .......................................................... 340/5.6

(58) Field of Classification Search
CPC ........... G07C 9/00087; G07C 9/00111; G07C 9/00158; H04L 63/0861; H04W 12/06
USPC .................. 340/5.6, 573.4, 539, 506, 539.13; 455/88, 100; 235/384
See application file for complete search history.

(56) References Cited

U.S. PATENT DOCUMENTS

| | | | |
|---|---|---|---|
| 4,993,068 A | 2/1991 | Piosenka et al. | 340/5.83 |
| 5,509,083 A | 4/1996 | Abtahi et al. | 382/124 |
| 5,682,142 A | 10/1997 | Loosmore et al. | 340/572.1 |
| 5,914,671 A | 6/1999 | Tuttle | 340/825.51 |
| 5,982,281 A | 11/1999 | Layson | 340/539 |
| 6,085,976 A | 7/2000 | Sehr | 235/384 |

(Continued)

*Primary Examiner* — John A Tweel, Jr.
(74) *Attorney, Agent, or Firm* — Clifford Kraft (57) ABSTRACT

A method and system for airport or other building security where passengers or persons entering a building approach a check-in point or check-in counter and must undergo a positive identification (ID) by fingerprint scan, retinal or iris scan, face feature scan, or an other means of positive identification. A digital photograph can then be taken of the person. This data plus the positive ID data and optional data about the person including a scan of a government supplied ID like a drivers license or passport is entered in a database and checked against various law enforcement databases such as FBI or others for law enforcement interest in the person.

10 Claims, 5 Drawing Sheets

(56) References Cited

U.S. PATENT DOCUMENTS

| | | | |
|---|---|---|---|
| 6,127,917 A | 10/2000 | Tuttle | 340/10.1 |
| 6,229,445 B1 | 5/2001 | Wack | 340/572.1 |
| 6,246,320 B1 | 6/2001 | Monroe | 340/506 |
| 6,335,688 B1 | 1/2002 | Sweatte | 340/573.1 |
| 6,338,041 B1 | 1/2002 | Kawamata | 705/5 |
| 6,674,367 B2 | 1/2004 | Sweatte | 340/573.1 |
| 7,109,869 B2 | 9/2006 | Sweatte | 340/573.1 |
| 7,515,055 B2 | 4/2009 | Sweatte | 340/573.4 |

METHOD AND SYSTEM FOR AIRPORT SECURITY

This is a continuation of application Ser. No. 12/407,032 filed Mar. 19, 2009 which was a continuation of application Ser. No. 11/433,830 filed May 12, 2006, now U.S. Pat. No. 7,515,055 which was a continuation-in-part of application Ser. No. 10/751,552 filed Jan. 5, 2004, now U.S. Pat. No. 7,109,869 which was a continuation-in-part of application Ser. No. 10/023,421 filed Dec. 17, 2001, now U.S. Pat. No. 6,674,367 which was a continuation-in-part of application Ser. No. 09/669,417 filed Sep. 25, 2000, now U.S. Pat. No. 6,335,688 which was related to, and claimed priority from provisional patent application No. 60/156,447 filed Sep. 28, 1999. U.S. Pat. Nos. 7,109,869, 6,674,367, 6,335,688, and application Ser. Nos. 12/407,032, 11/433,830 and 60/156,447 are hereby incorporated by reference in their entirety.

The text of this application is substantially identical to that of the parent application Ser. No. 09/669,417.

BACKGROUND

1. Field of the Invention

This invention relates generally to the field of airport security and more particularly to a method and system for identifying and tracking a passenger or employee in and through airports.

2. Description of the Related Art

It is well known in the art of airport security to provide an identification badge to employees. Passengers on the other hand are identified only by a single photo ID that may be presented at check-in time. Security consists entirely of two questions concerning baggage. No check is made on the passenger and the passenger's whereabouts is not tracked. The only other encounter where anything is checked is when the passenger checks into a flight. Here a boarding pass is presented and the passenger boards the aircraft. There is no verification that the same passenger who checked in is the one that boarded, and it is very easy for a boarded passenger to exit the aircraft after boarding without being noticed by anyone. In short, security at airports is minimal as to who a passenger is and where the passenger is.

Prior art systems have proposed electronic tickets and smartcards that can be carried by passengers. Tuttle in particular in U.S. Pat. No. 5,914,671 teaches a system for locating an individual in a facility where a portable wireless transponder device is borne by the individual. Tuttle's device resembles a standard security badge with a possible photo of the individual on the badge. Tuttle's invention is directed toward location of employees who would wear such badges. Tuttle also teaches that a passenger could also possess such an ID and be located. However, Tuttle makes no reference to any type of security checking of the individual. U.S. Pat. No. 5,914,671 is hereby incorporated by reference.

Yokozawa et al. in U.S. Pat. No. 5,740,369 teach an information delivery system and portable information terminal where an individual possesses a smartcard type of wireless device and can be tracked by a wireless system. Yokozawa also teaches a person passing through a check-in gate with the gate itself recognizing and communicating with the portable device by wireless means. While Yokozawa teaches a wireless device carried by a passenger, this reference also fails to mention any security aspects of the situation. U.S. Pat. No. 5,740,369 is hereby incorporated by reference.

The prior art thus teaches systems where passengers and/or employees carry wireless smartcards that communicate in data bases; however, none of these systems solve the tremendous security problem that exists at airports where potential passengers could be terrorists, felons or other dangerous persons, and whether a passenger actually boards a flight and remains on the plane, and whether the passenger actually arrives and exits a second or subsequent airport. In the current airport system and prior art systems, there is no connection or relationship between airline database information and security database information.

What is badly needed in the art is a method and system of airport security where a passenger can be positively identified at check-in time, tracked at all times in that airport, tracked while boarding an aircraft, tracked upon arrival at a second or subsequent airport, and noted when exiting a final airport. In addition, a system is badly needed that ties into police or FBI databases to identify dangerous people in the airport or approaching flights or boarding aircraft and then leaving the craft before takeoff.

SUMMARY OF THE INVENTION

The present invention is a method and system for airport or building security where a passenger or other person presents him/herself at the check-in counter in the normal way. A government generated picture ID is also presented in the normal way (drivers license, passport, etc.). The present invention however then requires additional positive identification by fingerprint scan, retina scan, voice scan, handprint, palmprint, finger length comparison, or other means. In addition, a new photo can be taken of the passenger during check-in. The total data thus acquired can be compared against law enforcement, FBI, databases (also INTERPOL, etc.), or immigration to determine immediately if the potential passenger is wanted or known to be dangerous. There needs to be no indication at the check-in counter if a positive ID is made on a dangerous individual; rather, airport security personnel are immediately notified.

After the ID process, the passenger can be checked into the flight in the normal way and then given a smartcard wireless device (which will be called a PASS smartcard) which serves as a boarding pass and airport tracking device. The pass smartcard is a small, flat, card like a credit card that can contain electronics and wireless communication capabilities. Since the location of this smartcard wireless device can be tracked in the airport by normal wireless antenna location means, by GPS, or by direction fixing between multiple antennas, or any other tracking means, the approximate location of the person is known at all times while in any area of the airport or building. In the case of a positive ID of a dangerous or wanted individual, law enforcement officials can apprehend the person anywhere in the airport or building that allows a safe and non-disruptive apprehension.

The system also reports when the person has passed through carry-on security (normal X-ray, etc.), or any other security check point, when the person is in the departure gate area, and when the person has boarded an aircraft. At boarding, a second security check can be made with a second fingerprint or retinal scan or any other positive identification means to verify that the person who checked in originally is the one boarding the flight. The system can positively make sure the person boards a certain aircraft and stays on since egress could be controlled by having to present the PASS smartcard to exit. In the rare case of someone having to legitimately leave an aircraft after boarding, airline personnel would be immediately notified by the smartcard at egress to ascertain why the exit is being made and being able to assist the person (who might have gotten on the wrong plane, might be sick, etc.). An illegal or unexpected egress would be immediately noted by airport security personnel. It is also possible to continue to communicate with the PASS smartcard inside the aircraft if the craft is also equipped with a wireless system. In addition, satellite communication can be carried on with the aircraft and smartcards inside the aircraft while it is in flight or parked at a gate.

Upon arrival at a final or intermediate airport, a normal egress from the aircraft would be noted by the system in the new airport. The passenger's location could be tracked by the system to baggage pickup and airport exit, or until re-boarding a subsequent flight. When the passenger finally exited the final airport, the smartcard could be collected and recycled for reuse, and the system would note that the person had left the system.

The key to the present invention, and the major improvement over prior art, is the total and positive identification of the person, a possible security check on every individual in an airport or any other secure building against law enforcement or immigration/customs information, positive tracking at all times as to the location or the person in the world air transportation system consisting of all participating airports, and a final determination that an individual has arrived at a final destination and departed the system.

The present invention could be optionally applied to all people in airports or any other building including visitors by also requiring them to register on entry, at least by fingerprint scan, and also carry a pass smartcard while in the airport or building. This system would not be an unacceptable burden on privacy considering it would be totally unintrusive except for the required positive ID and the requirement to carry the smartcard while in the airport. Anyone who tried to leave an airport without a smartcard could be stopped and re-identified (sometimes people might loose the smartcard). A lost pass smartcard could be located through wireless communication with it. In this optional scenario, probably only a fingerprint check would be made at the entry with a very simple, visitor's PASS smartcard being given to the person. In the case of a passenger; a more sophisticated PASS smartcard could be exchanged at check-in time.

The more sophisticated version of the PASS smartcard could be equipped with an LED display device where flight schedules could be called up and with a alarm that would buzz or otherwise indicated upon the approach of boarding time. In addition, the more sophisticated PASS smartcard could be tied into the internet for the convenience of the passenger so that the passenger could receive or send E-mail, get stock quotes, or generally surf the internet while waiting for the flight. An buzz or audible alarm could sound if there was an important announcement coming in for that passenger such as a gate change, etc.

The present invention anticipates the need for greater and more sophisticated security at airports, other buildings, secure venues, and/or government facilities. It offers a simple but elegant solution to the problem of whether a person should be in a certain area or not, whether the correct passenger has actually boarded and stayed on a flight, and whether at a final destination, a passenger has deplaned and actually left the airport. The present invention prevents someone having two boarding passes, or someone boarding the wrong flight, or someone exiting an aircraft after boarding without airline personnel being aware. In addition, the present invention allows apprehension of wanted persons entering airports or boarding flights while preventing identity switches between the person who checked in and the person who actually boarded the aircraft. The present invention can also optionally be used for non-passengers such as employees and visitors.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DESCRIPTION OF PREFERRED EMBODIMENTS

Figure 1:
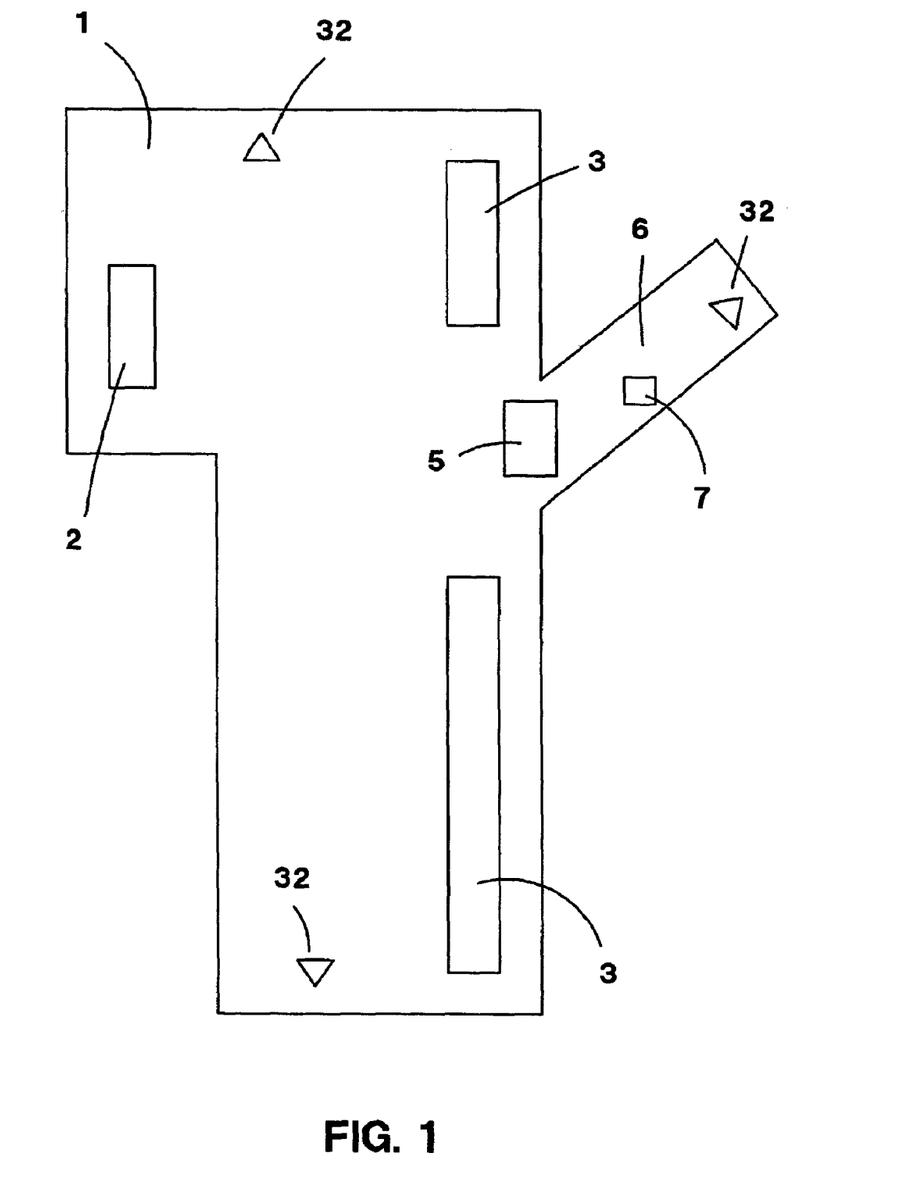
FIG. 1 shows an embodiment of the present invention as a diagram of an airport showing important points in the security scheme.

FIG. 1 shows a diagram of an airport or other building where the present invention is used as a passenger or personnel security system. Most airports contain an entry area or set of doorways 1 where people enter and leave the airport complex. An optional PASS system check-in area 2 can be set up here if it is desired to control people entering and leaving the facility. If this station is used, a person entering the airport simply allows a fingerprint or retinal scan to be taken at this point. People departing the airport or building must turn in PASS smartcards at this point in order to egress. Further discussion of this possible checkpoint at the airport entrance will continue after a description of the other possible checkpoints in the system.

Most airports are constructed with an airline check-in area with long counters where passengers are checked into flights. FIG. 1 shows several such check-in counters 3. At these counters passengers queue up and wait to present their tickets. This particular check-in point is where most data is entered into the PASS system of the present invention. When a passenger presents a ticket to an agent at this type of checkpoint, the passenger is required to also present some sort of government issued photo ID. Usually this is a driver's license or passport. At this point, the present invention can be used to scan in the photo on the presented photo ID. Any special information about the passenger that is needed or desired by the airline can also be entered such as medical information, special food requirements and other information as may be needed by the airline. Normal seat assignment or check can be made at this point.

At this point, the perspective passenger is required to submit to a positive ID check. This ID check can be in the form of a fingerprint scan, an eye retinal scan, a hand scan, a palm-print, a hand scan, a finger length scan, or any other positive identification means including DNA or other means for positive identification. After the passenger has had positive ID data taken, the PASS system optionally takes a current photo of the passenger, and presents all the data to a computer data base. At this point, the data can be checked against Police, Department of Motor Vehicles (DMV), FBI, INTERPOL, immigration, customs, postal service, or other databases. If law enforcement databases are remote from the airport, the data can be transmitted by modem, LAN, WAN, internet, or any data transmission other means.

The passenger is then handed a PASS smartcard which will be fully described shortly. This smartcard is a wireless device that can contain data and can be tracked for location throughout the airport complex. The passenger is of course also entered into the airline database in the normal way for flight check-in and possibly for weight and balance. The system contains antennas 32 for tracking the smartcard. These antennas 32 can be located in many places in the building or airport complex in question.

The passenger is then allowed to leave the check-in counter with the PASS smartcard as an electronic boarding pass and tracking system. If there has been any discrepancy in the ID given by the passenger after checking the data against law enforcement and DMV databases, law enforcement or airport security officials can track the location of the bearer of the PASS smartcard anywhere in the airport. If there is sufficient cause, the passenger could be apprehended at a time and place determined by law enforcement or security officials (assuming an outstanding warrant, a false or forged ID, or other major reason for concern).

Most airports are constructed with a baggage and carry-on security checkpoint 5 which usually contains X-ray equipment for checking carry-on bags and metal detectors (possibly explosive detectors) to check for weapons and dangerous material. In the present invention, this checkpoint 5 also can communicate by wireless means with any PASS smartcard nearby. As the passenger passes through this checkpoint, the system notes this progress. The PASS smartcard can be optionally hand read with a magnetic reader, or the entire process can be carried out by wireless communications. If the passenger subsequently leaves the secure gate area for any reason, this can also be noted.

Once in the gate area 6, the passenger approaches the flight departure gate and passes another checkpoint 7. Here again the system notes the location of the passenger and the fact the he or she is actually boarding an aircraft. A database check can be made to assure it is the correct aircraft, and if wrong, airline personnel can be immediately notified. At this aircraft boarding checkpoint 7, a second positive identity check can be optionally performed such as taking another fingerprint, retinal scan, etc. again. While this second scan is optional, it tremendously enhances security if used since it can be determined if the correct individual is the one boarding the aircraft.

If a passenger tries to leave an aircraft after successful boarding, the PASS smartcard can be immediately detected, and airline personnel and if necessary security personnel, can be notified. Since there may be legitimate reasons a passenger might deplane (sickness, trying to make a phone call, simply changed mind about traveling, etc.), airline personnel should make sure at this point the reason. The difference between the present invention and the prior art is that with the present invention, the fact that the passenger has deplaned is immediately known.

The present invention can also determine if a given individual is in possession of more than one PASS smartcard, or if a card has been lost. This feature is very useful in making sure that passengers on planes are the ones who should be there and that they actually take the flight. If someone tries to deplane without a PASS smartcard in their possession an alarm could be set off or security personnel could be notified. This is easily accomplished since there could be an alarm at the plane entry and exit point 7 that detects anyone trying to pass. A quick interrogation of the person's PASS smartcard could prevent the actual ringing of an alarm while still alerting airline personnel.

Figure 2:
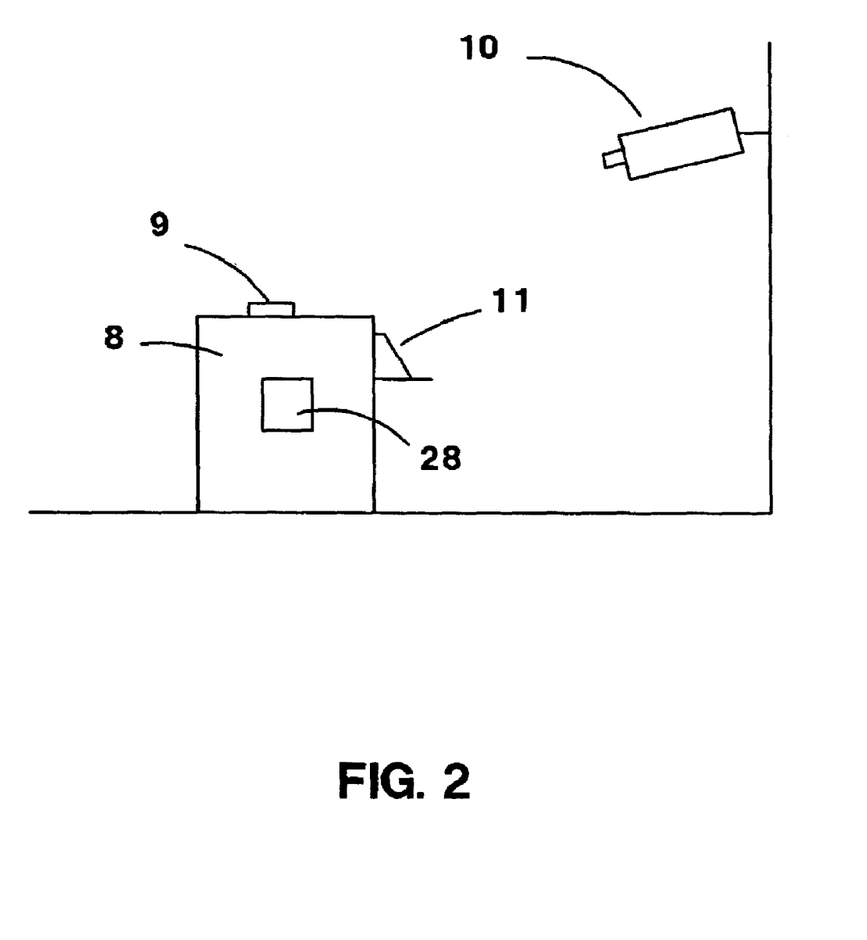
FIG. 2 shows a check-in arrangement.

FIG. 2 shows a side view of an airline check-in station using the present invention. There can be the normal counter 8 commonly found at airports with means for checking in baggage (not shown) and for assigning or checking seating. There can also be a standard computer terminal 11; however this terminal can connect to the PASS system software of the present invention which prompts the operator for specific information required to be entered as well as optional information. In addition, this terminal 11 can allow normal entry of airline passenger check-in data.

The check-in station can contain a positive identification means or device 9 which can be a fingerprint scanner, an eye retinal scanner, advanced DNA scanner, hand scanner, palmprint scanner, finger length scanner, or any other means that may exist now or in the future for positive identification of an individual. The station is also equipped with a camera 10 which can be a digital still photo camera, a TV camera, or any other type of camera or image generation means. The station can also contain a document scanner 28 known in the art for scanning in the ID presented by the passenger.

At check in, the passenger approaches the check-in station counter 8 in the normal way. As mentioned, an optional, government generated, photo ID such as a drivers license or passport can be presented by the passenger and scanned using the scanning means 28 provided in the station. A digital photo can optionally be taken with the camera means 10, and a positive identification can be made with the positive identification means 9. The preferred method is a fingerprint scan or an eye retinal scan; however, any means or method of positive identification of an individual is within the scope of the present invention.

After the above mentioned data is taken, it is entered into the PASS database of the present invention. From here it can be transmitted or compared against law enforcement, immigration, or customs information to determine if the individual is wanted or is a threat in any way, or if there is any other law enforcement interest. After normal airline check-in, the passenger is presented with a PASS wireless smartcard which will be described in more detail shortly. This smartcard is equipped with a transponder so that it can be tracked as to location anywhere in the airport.

Figure 3:
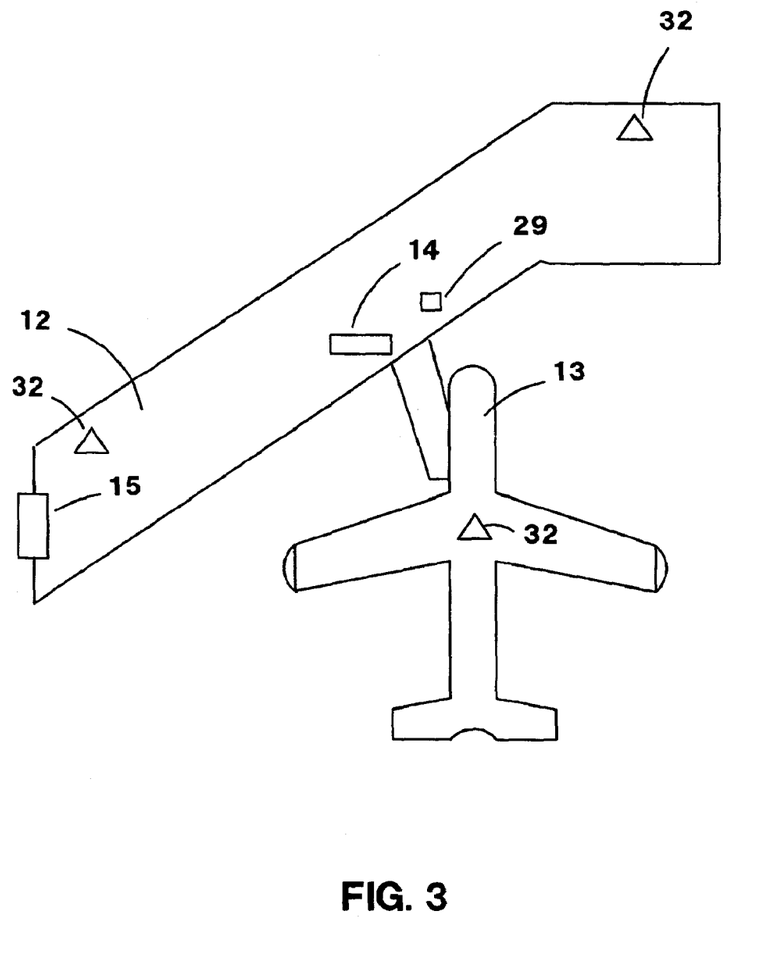
FIG. 3 shows a aircraft boarding gate with egress control.

FIG. 3 shows a typical airport gate area. There is an entrance security port 15 which contains the standard carry-on and personal security checks (x-ray and metal detector). In addition however, the present invention can contain a wireless interface with the PASS smartcard located at this security gate. As the passenger passes through this security portal into the secure gate area, the portal 15 can send an optional message to the smartcard "marking" it as to the fact that the passenger is now in the gate area 12 as well as entering the fact in the PASS database. A similar portal (without carry-on check) 14 can be located at the aircraft doorway so that when the passenger actually enters the aircraft 13, the PASS smartcard can again be "marked" or updated indicating the passenger is actually aboard. An optional positive identification could be made at this point with an optional second positive identification device 29 to assure that the correct person has boarded. This extra step would of course be optional since not all airlines might want to carry security this far.

In addition, the wireless communication can be continued on into the aircraft if the craft is equipped with wireless communications capability. The aircraft's security system could thus also maintain satellite communication with the rest of the PASS system at all times including when the aircraft is in flight.

In any case, the present invention allows tracking of the passenger from the non-secure part of the airport into the secure gate area, and finally onto the aircraft by various antennas 32 located throughout the facility or airport. Upon arrival at a different airport, the present invention allows tracking of the passenger from the aircraft 13 into the secure gate area 12 out of that area to a baggage area or to another transfer aircraft, and either out of the airport or onto a second aircraft. The present invention would trap any abnormality such as exiting the aircraft after boarding, carrying more than one smartcard, or in the case of the second positive ID, the wrong person boarding. Airline personnel or law enforcement or security could be notified of any such abnormal event. The present invention also gives airline and law enforcement personnel positive knowledge of who was on an aircraft. In the unlikely event of an aircraft accident, this information could be very valuable in determining who was involved or in identification of bodies (who may still have functioning smartcards on their persons).

Figure 4A:
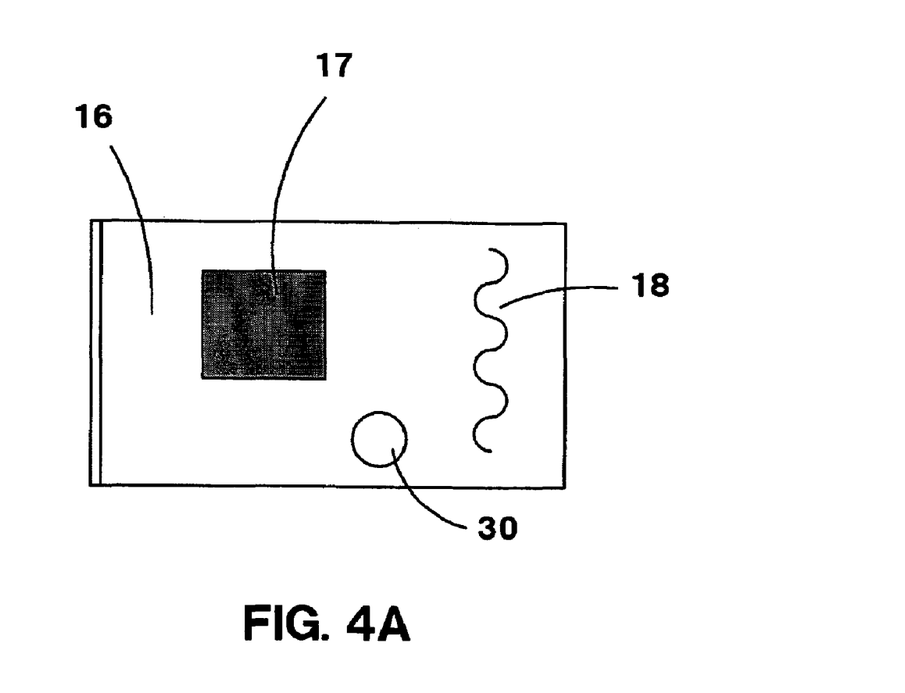
FIGS. 4A-4B show a representative drawing of a possible PASS smartcard along with LED display and audible alarm.
Figure 4B:
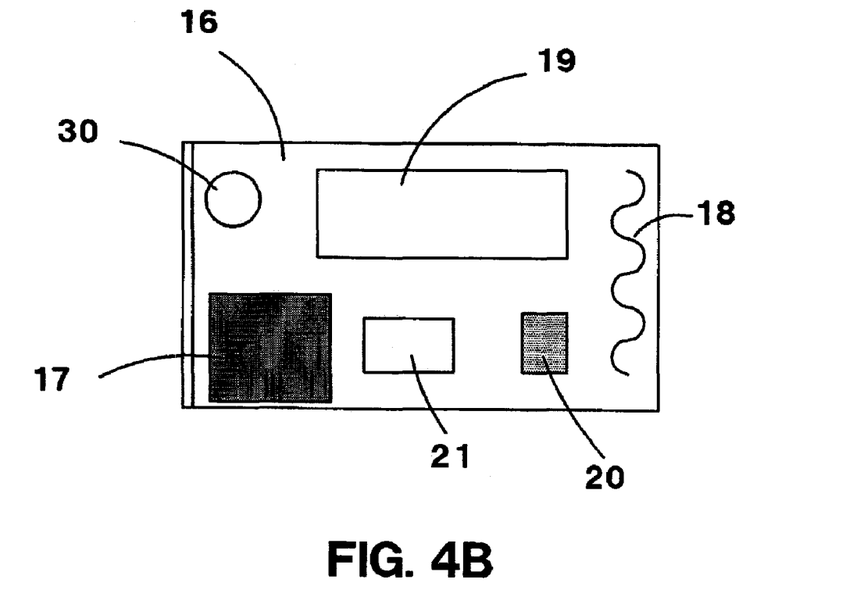

FIGS. 4A and 4B show replicas of a PASS smartcard 16. The model in FIG. 4A is a simple card used for identification only. This model contains a processor and wireless transponder 17 embedded in the card. An antenna 18 can also be embedded in the card as well as a battery 30. The processor can also contain optionally RAM or ROM memory. Various programs or processes can be used with the PASS smartcard 16 which will be described shortly. The processor can be a microprocessor or microcontroller or any other processor means. Memory can be internal or external to the processor.

FIG. 4B shows a more sophisticated version of a PASS smartcard 16. Here, in addition to the features described in relation to the smartcard shown in FIG. 4A, the card can contain an LCD display 19, a microphone/speaker 20, a miniature mouse 21 and other features needed to transmit, receive, and/or display information. These optional features can be incorporated in various embodiments of the present invention and are not all required; rather, any combination of them or any other information manipulation devices are within the scope of the present invention.

The advanced PASS smartcard 16 of FIG. 4B can in addition to providing basic security tracking, display flight information, information from the internet, stock prices, news headlines or stories, or any other type of information that might be of interest to the passenger. In addition, the advanced smartcard of FIG. 4B could also be used to play various games using the mouse device 21. A more advanced version could also contain a cellular telephone (not shown).

In all cases, the PASS smartcard would store information about the person who was carrying it. This would aid in identifying who was carrying it if it is lost, misplaced, or deliberately abandoned, or in the case of an aircraft accident.

Tracking of the PASS smartcard 16 within the airport can always be accomplished using a series of local antennas within the building. Normal burst transponding techniques can be used. Any type of wireless method of handling multiple stations can be used including spread-spectrum, bluetooth wireless, or any other wireless means. Transmission between airport antennas and the smartcard 16 can be radio frequency or optical, including infrared, continuous, packet, burst, or any other means using time-division multiplex, frequency division multiplex, code division multiplex, ATM, or any other communication method. Modulation can AM, FM, PM, using any type of PCM or data communications technique or combination of these methods including QAM and QPSK, or any other modulation technique. In addition error correcting codes and retransmission techniques known in the art can be used to assure data integrity.

Figure 5:
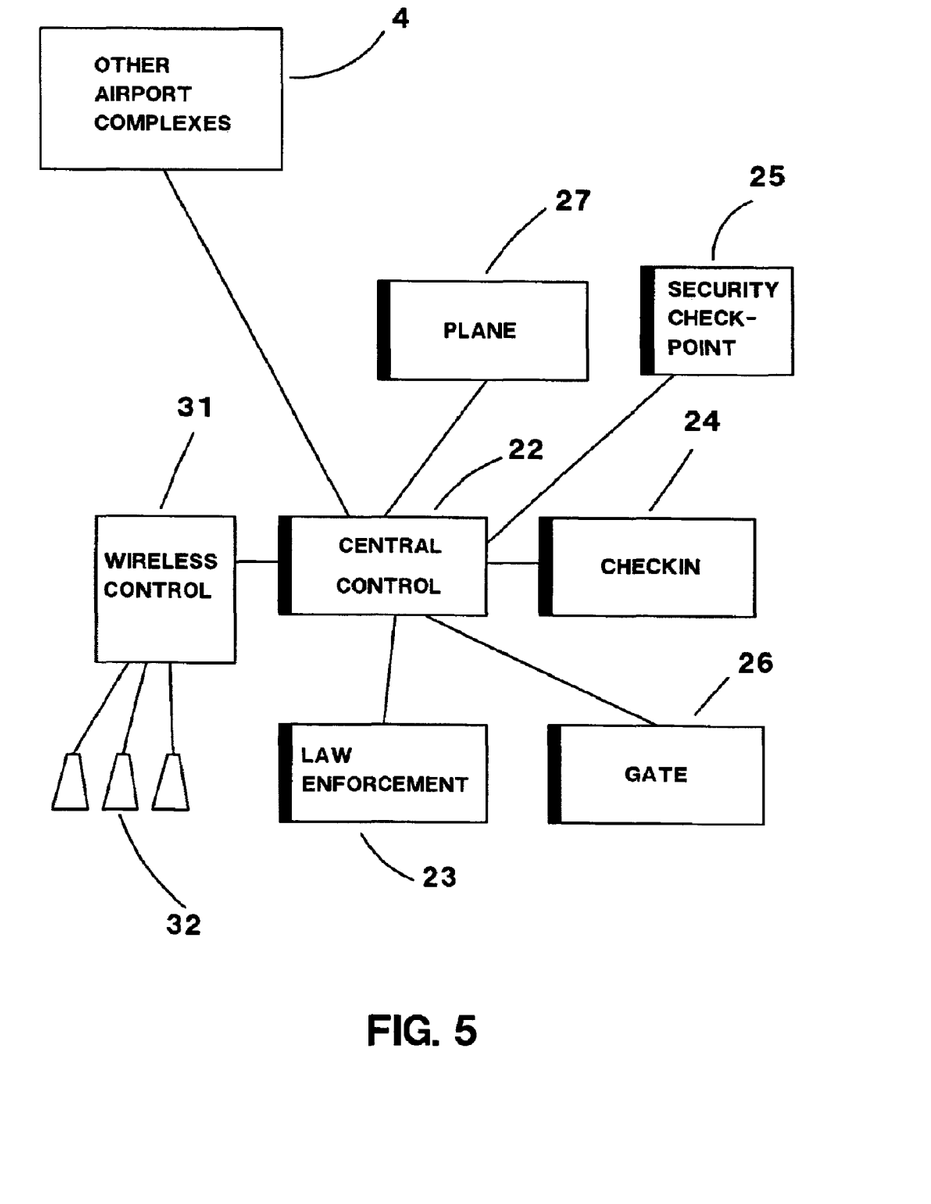
FIG. 5 shows a block diagram of the relationships between the PASS smartcard, check-in, and security/law enforcement data bases.

FIG. 5 shows the logical relationships between the various possible components of the present invention. It should be remembered that other relationships are also possible and within the scope of the present invention. A central control and database 22 can be a mainframe, PC, or any other type of computer system. This central control is connected by modem, LAN, WAN, internet, or any other communications means to law enforcement, immigration/customs and/or DMV data bases 23 for identification verification and determining if a given individual is of any interest to law enforcement officials. The central control 22 is also connected by cable, LAN, WAN, modem, wireless, or by any other connection means to check-in points 24 where airline personnel check in passengers, security check points 25, boarding gates 26, and other points in the airport including parked aircraft 27. In addition to the links shown, the central control point 22 for a given airport can be connected to control points for other airports 4 or to a master control point for a country or even the entire world (not shown). Communications can continue into the interior of aircraft, even aircraft in flight with satellite communications.

The central control point 22 in FIG. 5 is also tied to a wireless communication system controller 31 within an airport or building. This wireless controller 31 is connected to a number of antennas 32 located throughout the airport or building. As stated before, communications can be accomplished by any indoor or interior RF technique including Bluetooth technology, standard spread spectrum using either direct spreading or frequency hopping, or any other RF wireless or optical technique. Such RF and optical communications techniques are not new, but rather are known in the art, and form building blocks for the wireless communication features of the present invention. In addition to techniques that currently exist, the present invention envisions new techniques in the future that could also form building blocks for the systems described by the present invention. Such future communications methods and techniques are within the scope of the present invention.

Position location can be accomplished by using signal strength to determine the nearest antenna to the PASS smartcard in question, direction fixing by multiple antennas, or GPS techniques where a GPS receiver is incorporated into the PASS smartcard. Currently GPS receivers are bulky and cannot be readily incorporated into a smartcard; however, as technology improves and becomes smaller in physical size, it is foreseeable that GPS could be part of the tracking means and method of the present invention. No matter how position is determined, the present invention requires resolution to at least major location areas within an airport. The higher the position resolution, the better; however, the system can run with minimum position resolution as long as position is known well enough for security personnel to find a person in an airport or building area.

In the case where multiple airports or buildings are linked into a single system, passengers with smart cards can be tracked from airport to airport around the world from the time a passenger first enters and airport to the time the passenger leaves the airport system at a final destination including tracking of passengers aboard aircraft in flight using satellite communication techniques. In addition, the system of the present invention can track airport employees both full time and part time or temporary, and baggage if a smartcard is attached to baggage. Even though the present invention could be used to track baggage, its primary purpose is to identify and track passengers or people in a building from the point of view of security and law enforcement as well as that of the airline. Thus, the most powerful feature of the present invention is its ability to identify and find an undesirable passenger, or one with whom law enforcement or security might have an interest and its ability to detect an unexpected event such as the egress of a passenger from an aircraft or a secure gate area or the abandoning of a smart card. The latter case could be detected if the card does not change location for a given period of time. An alternate means of detecting the fact that a smartcard has been lost or abandoned is for it to contain an optional body heat detector. An overall lowering of temperature could indicate an abandoned smartcard.

In one of its forms, the PASS system of the present invention could keep records or passengers who fly frequently so that when they re-entered the airport system, data could be sent to them via the smartcard as to fare specials, etc. Also, repeat travelers could be tracked as to their trips and their destinations to aid law enforcement locate illegal couriers, etc.

It is to be understood that the above-described arrangements are merely illustrative of the application of the principles of the invention, and that other arrangements may be devised by those skilled in the art without departing from the spirit and scope of the invention.

I claim:

1. A facility security identification system comprising:
   a portable security device, said security device containing a memory, a first communications circuit and a tracking circuit, wherein said memory stores a particular individual's name as well as biometric identification information identifying said particular individual, said biometric identification information being accessible through said first communications circuit;
   a checkpoint located in said facility containing a second communications circuit, said second communications circuit communicating with said portable security device to access said individual's name and said biometric identification information from the memory in said portable security device;
   a first computer containing at least one database in communication with said checkpoint, said computer making a data entry into said database when said portable security device passes said checkpoint;
   wherein, said first computer, or a second computer in communication with said first computer, can communicate with said tracking circuit in said portable security device ascertaining a location of said portable security device within a building and whether said portable security device has been abandoned;
   and wherein said first or second computer communicates with at least one law enforcement database.

2. The facility security system of claim 1 wherein said portable security device is an identification card.

3. The facility security system of claim 2 wherein a person carrying said identification card presents current biometric identification information at said checkpoint.

4. The security system of claim 3 wherein law enforcement personnel are notified when said current biometric information does not match the biometric information stored in said card.

5. The security system of claim 1 wherein law enforcement personnel are notified when said individual is found to be of law enforcement interest in said law enforcement database.

6. A facility security identification system comprising:
   a portable security device, said security device storing a particular individual's name as well as biometric identification information identifying said particular individual;
   a checkpoint located in said facility communicating with said portable security device to access said individual's name and said biometric identification information;
   a first computer containing at least one database in communication with said checkpoint, said computer making a data entry into said database when said portable security device passes said checkpoint;
   wherein, said first computer, or a second computer in communication with the first computer, can communicate with a tracking circuit in said portable security device ascertaining a location of said portable security device and whether said portable security device has been abandoned;
   and wherein said first or second computer communicates with a law enforcement database.

7. The facility security system of claim 6 wherein said portable security device is an identification card.

8. The facility security system of claim 6 wherein a person carrying said portable security device presents current biometric identification information at said checkpoint.

9. The security system of claim 8 wherein law enforcement personnel are notified when said current biometric information does not match the biometric information stored in said portable security device.

10. The security system of claim 8 wherein law enforcement personnel are notified when said particular individual is found to be of law enforcement interest by comparing said current biometric information with biometric information stored in a database.

* * * * *